Patented Oct. 9, 1951

2,570,792

UNITED STATES PATENT OFFICE 2,570,792

PROCESS FOR PREPARING POLYHYDRIC ALCOHOLS AND RELATED PRODUCTS

William F. Gresham, Wilmington, Del., assignor to E. I. du Pont de Nemours and Company, Wilmington, Del., a corporation of Delaware.

No Drawing. Application December 8, 1949, Serial No. 131,938

9 Claims. (Cl. 260—449)

This invention relates to a novel synthesis of polyfunctional oxygen-containing organic compounds and more particularly to the preparation of polyhydric alcohols and their derivatives by reactions involving the use of carbon monoxide and/or carbon dioxide and hydrogen as starting materials. This application is a continuation-in-part of my copending application S. N. 793,521, now abandoned, which was filed on December 23, 1947. It is also a continuation-in-part of my copending application S. N. 55,016 which was filed on October 16, 1948.

It has been known for many years that monofunctional compounds, such as methanol, can be obtained by reaction between carbon monoxide and hydrogen at elevated pressures, e. g. at pressures up to about 1000 atmospheres. By reaction between carbon monoxide and methanol in the presence of certain types of catalyst, other monofunctional compounds such as acetic acid, methyl acetate, etc., have also been obtained. In my aforesaid earlier patent applications S. N. 793,521 and S. N. 55,016 I have disclosed that at sufficiently high pressures, generally in excess of 1000 atmospheres, the hydrogenation of carbon monoxide in the presence of catalysts yields polyfunctional compounds. Outstanding among the hydrogenation catalysts in the process which is disclosed in applications S. N. 793,521 and S. N. 55,016 are the catalysts containing cobalt. The present invention is directed to carrying out the process in the presence of another specific type of catalyst which is also found to be highly effective.

An object of this invention is to provide a process for the preparation of polyfunctional oxygen-containing organic compounds by reaction between an oxide of carbon and hydrogen. Another object of the invention is to provide a process for the synthesis of ethylene glycol directly from carbon monoxide and hydrogen. Still another object is to provide a process for the synthesis of glycerol from carbon monoxide and hydrogen. Other objects of the invention will appear hereinafter.

It has been discovered in accordance with this invention that, if the hydrogenation of an oxide of carbon is carried out in the presence of a hydrogenation catalyst containing both manganese and chromium, at a sufficiently high pressure, relatively large quantities of polyfunctional compounds are produced. The present invention thus provides a method for preparing polyhydric alcohols and derivatives thereof from carbon monoxide and hydrogen, in accord with the equation $nCO+(n+1)H_2=H(CHOH)_nH$, $n$ being an integer greater than 1. Frequently, in the practice of the invention, formate esters of the compounds of the formula $H(CHOH)_nH$ are produced simultaneously with the free polyhydroxy compounds.

It has been discovered in accordance with the present invention that by reacting an oxide of carbon with hydrogen in the presence of a catalyst containing both manganese and chromium, at pressures above 1000 atmospheres, and particularly above a minimum of about 1400 atmospheres, polyfunctional oxygen-containing organic compounds such as ethylene glycol, higher polyhydric alcohols, and esters of polyhydric alcohols can be obtained very readily. Alkaline promoters, such as the oxides, carbonates, hydroxides, etc., of the alkali metals and/or alkaline earth metals, may be present if desired, but they are not absolutely essential.

The formation of ethylene glycol, and formates thereof, from carbon monoxide and hydrogen in accordance with this invention may be represented as follows:

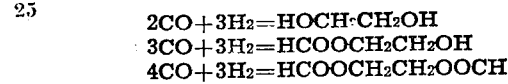

In the hydrogenation of oxides of carbon at pressures of 1000 atmospheres and below, virtually no polyfunctional compounds are produced. As pressures above 1000 atmospheres, preferably 2000 to 5000 atmospheres, polyfunctional compounds are obtained. For best results from the standpoint of rate of reaction and yield, it is desirable to employ certain specific catalysts, as disclosed in detail hereinafter. At pressures as low as about 1400 to 1500 atmospheres it is, in general, necessary to employ a relatively large quantity of catalyst, or a relatively high temperature, to obtain as rapid a reaction as is readily realized at higher pressures with less catalyst.

The reaction between carbon monoxide or carbon dioxide and hydrogen in accordance with this invention may be carried out either in the vapor phase or in the liquid phase. Inert diluents may be employed as desired, such as inert organic solvents, e. g. inert hydrocarbons (liquid alkanes, cycloalkanes, benzene, alkyl benzenes, etc.), ethers, and the like. It is also possible to employ solvents which react with the polyhydric alcohols which are in general produced in the practice of the invention. These reactive solvents include organic compounds containing active hydrogen atoms such as carboxylic acids and anhydrides of organic carboxylic acids, such as formic acid, acetic acid, propionic acid, stearic acid, benzoic acid, phthalic anhydride, acetic anhydride, benzoic anhydride; monohydric alcohols, polyhydric alcohols; esters, primary and secondary amines, ammonia; ketones, hydrogen cyanide, compounds with active hydrogen atoms alpha to a carbonyl or nitrile group, etc. Polyhydric alcohol esters may be employed as reaction media in the practice of the invention; for example, glycol formates or acetates may be used, particularly in embodiments which involve recycling of a part of the reaction mixture. The presence of either inert or reactive diluents facilitates removal of heat from the reaction mixture. A suitable diluent which can be employed in the practice of the invention is ordinary water, which, in preferred embodiments, may be present in sufficient quantity to prevent the formation of hydrolyzable products, such as esters, if desired.

If desired, the catalysts employed in the practice of this invention may be used in combination with inert materials or supports such as alumina, silica gel, activated charcoal, etc. The quantity of catalyst which is employed is not highly critical, but it is generally desirable to use a sufficient quantity of catalyst to effect a reasonably rapid reaction, e. g. about 0.001% to about 20% by weight, based on the total quantity of reaction mixture.

The temperatures which may be employed in the practice of the invention vary rather widely, and in preferred embodiments, the use of extremely high pressures permits carrying out the reaction at relatively low temperatures. The rate of formation of polyfunctional organic product obtainable at temperatures below 150° is extremely slow even at pressures in excess of about 2000 atmospheres. It is therefore desirable to employ temperatures above 150° to obtain a reasonably high reaction rate even though, from the standpoint of the composition of the reaction mixture under equilibrium conditions, it is desirable to operate at as low a temperature as possible. Temperatures above about 400° are generally not preferred even at pressures as high as 3000 atmospheres, because while the rate of formation of glycol or other polyfunctional product is improved by increasing the reaction temperature, the yield, based upon the quantity of carbon monoxide and hydrogen initially present, is poor at temperatures above about 400° C. Within the relatively narrow temperature range of 180° to 300° C., at pressures above 1500 atmospheres, outstanding results are obtained from the standpoint of yield and reaction rate.

The relative amounts of carbon monoxide and hydrogen which are present initially in the reaction mixture in the practice of the invention may be varied over a wide range but it is generally preferred that the mol ratio of $CO:H_2$ be within the range of 20:1 to 1:20, best results being obtained when the ratio of $CO:H_2$ is from about 3:1 to about 1:3. It is, of course, to be understood that reaction mixtures which give rise to the formation of carbon monoxide and hydrogen under the reaction conditions may be employed instead of the mixtures of carbon monoxide and hydrogen which are used in preferred embodiments in the practice of the invention. For example, good results are obtained when the reaction mixture is composed of carbon dioxide and hydrogen. Mixtures of carbon dioxide and carbon monoxide with hydrogen may, of course, also be employed. Other mixtures such as carbon monoxide and steam may be used if desired. Metal carbonyls and metal carbonyl complexes may be used to supply the carbon monoxide reactant, and the quantity of metal carbonyl thus employed may be varied over the widest possible range; in certain instances, this tends to lower somewhat the pressure which is required for the formation of polyfunctional compounds in the practice of the invention.

The process of the invention may be carried out either continuously or batchwise. Optimum results are generally obtained at the shortest reaction times capable of giving an appreciable conversion to the desired product. When primary reaction products, or simple difunctional compounds, are desired in maximum yield (i. e. without the formation of excessive quantities of by-products), it is preferable to operate at relatively low conversions. In the continuous process it is generally desirable to recirculate the unreacted gas, preferably with make-up carbon monoxide and hydrogen. In one preferred method of practicing the invention a high pressure separator is employed to remove the polyfunctional organic product (e. g. ethylene glycol crude or solution thereof, e. g. aqueous solution of ethylene glycol), from the reaction mixture. Other methods known in the art may be employed for separating from the reaction mixture the polyfunctional compounds obtained in the practice of this invention. Suitable methods include distillation, fractional condensation, extraction, etc.

Since the formation of polyhydric alcohols and the like from carbon monoxide and hydrogen in accordance with this invention is an exothermic process, suitable means should be provided for withdrawal of heat from the reaction mixture while the reaction is in progress. This removal of heat can be accomplished by any convenient method and in a specific embodiment is effected by carrying out, simultaneously with the reaction between the oxide of carbon and hydrogen, an endothermic process under such conditions that the heat evolved by the exothermic reaction is at least in part absorbed by the endothermic process. Also, diluents, such as water, etc., may be used to assist in withdrawal of the heat of reaction.

The reaction between the oxide of carbon and hydrogen in accordance with this invention can be carried out in any suitable reaction vessel capable of withstanding very high pressures. Reaction vessels which are made of or lined with materials which remain inert in the presence of the reaction mixture are preferably employed, i. e. the reaction vessel may be made of steel which, if desired, can be lined with such inert materials as silver, copper, platinum, gold, platinum-iridium alloy, platinum-ruthenium alloy, titanium, refractories, etc.

This invention is illustrated further by means of the following examples.

*Example 1.*—A mixture of carbon monoxide and hydrogen (mol ratio 3.8/1) was passed over 60 cc. of a Mn-Zn-Cr catalyst (initially manganese chromite+1% by weight of zinc chromate) at a temperature of 400° C. under 2000 to 3000 atmospheres pressure. The condensible liquid product was collected during 4 hours of operation. About one-half of this product had a boiling point below 51° C./100 mm.; the remainder boiled within the range from 51°/100 mm. to 120°/3 mm. The latter fraction (11.8 grams) contained hydroxy compounds, including ethylene glycol (as shown by the periodate method), and formate esters thereof.

Example 2.—A mixture of carbon monoxide and hydrogen (mol ratio 3.8:1) was passed over 60 cc. of a manganese chromite catalyst, containing initially 1% by weight of potassium carbonate, at a temperature of 300° C. under a pressure of 2000 atmospheres, for 4 hours. The resulting product (56.5 grams) was distilled, and a foreshot (5.6 grams) was collected by heating the distillation vessel with an oil bath at a temperature of 160° C., after which a higher boiling fraction (B. P. 53° C./95 mm.) to 140°/2 mm (22.2 grams) was obtained. The refractive index of the latter fraction varied from 1.4285 (25° C.), for the first portion to distil, to 1.5034 for the highest boiling portion. All parts of the fraction had refractive indices which were higher than the corresponding refractive index of monohydric alkanol having the same boiling point; this is further evidence of the presence of polyhydric alcohol. Fractionation of the product gave a very crude glycerol fraction, B. P. 89° to 140° at 2 mm., having a refractive index of 1.5038 (25° C.).

It is to be understood that the above examples are illustrative only and that numerous ways of practicing the invention will occur to those who are skilled in the art.

The present invention is useful in that it provides a process for the synthesis of the lower polyhydric alcohols, and other products, directly from cheaper source materials than heretofore were required in the manufacture of these products.

I claim:

1. A process for the preparation of polyhydric alcohols which comprises reacting an oxide of carbon with hydrogen in the presence of a catalyst containing both manganese and chromium at a pressure above 1000 atmospheres and separating polyhydric alcohol from the resulting product.

2. The method for preparing ethylene glycol which comprises interacting carbon monoxide and hydrogen in the presence of a catalyst containing both manganese and chromium at a pressure of 1500 to 5000 atmospheres in accord with the equation: $2CO + 3H_2 = HOCH_2CH_2OH$.

3. The process of reacting an oxide of carbon with hydrogen at a pressure within the range of 2000 to 5000 atmospheres at a temperature of 150° to 400° C. in the presence of a catalyst containing manganese and chromium, and thereafter separating from the resulting mixture the polyfunctional oxygen-containing organic product formed by the ensuing reaction.

4. The process of reacting an oxide of carbon with hydrogen at a pressure within the range of 2000 to 5000 atmospheres at a temperature of 180° to 300° C. in the presence of a manganese-zinc-chromium catalyst, and thereafter separating from the resulting mixture the polyfunctional oxygen-containing organic product formed by the ensuing reaction.

5. The process of claim 4, performed in the presence of water.

6. The process of claim 4, performed in the presence of an inert liquid diluent.

7. A process for the manufacture of ethylene glycol which comprises reacting carbon monoxide with hydrogen at a pressure within the range of 2000 to 5000 atmospheres at a temperature within the range of 180° to 300° C. in the presence of a catalyst containing manganese, zinc and chromium, and thereafter distilling the product and separating a fraction containing ethylene glycol from the resulting mixture.

8. The process of claim 7 in which the mole ratio of $CO:H_2$ is initially from 20:1 to 1:20.

9. The process of claim 7 in which the mole ratio of $CO:H_2$ is initially from 3:1 to 1:3.

WILLIAM F. GRESHAM.

REFERENCES CITED

The following references are of record in the file of this patent:

UNITED STATES PATENTS

| Number | Name | Date |
|---|---|---|
| 1,625,925 | Woodruff et al. | Apr. 26, 1927 |
| 1,746,783 | Lazier | Feb. 11, 1930 |
| 1,829,046 | Lazier | Oct. 27, 1931 |
| 1,900,829 | Lusby | Mar. 7, 1933 |
| 2,061,470 | Larson | Nov. 17, 1936 |